March 4, 1952 F. W. ROBERTS ET AL 2,588,327

RECORDER HEAD

Filed Jan. 31, 1948

INVENTORS
Frederick W. Roberts
Frederick L. Franz
BY
Blair, Curtis + Hayward
ATTORNEYS Patented Mar. 4, 1952

2,588,327

UNITED STATES PATENT OFFICE 2,588,327

RECORDER HEAD

Frederick W. Roberts, Fairfield, and Frederick L. Franz, West Haven, Conn., assignors to Dictaphone Corporation, Bridgeport, Conn.

Application January 31, 1948, Serial No. 5,646

8 Claims. (Cl. 179—100.41)

This invention relates to recorder heads for inscribing sound signals upon record surfaces. More particularly it relates to an improved electromagnetic recorder head in which a stylus, supported by a vibratable reed-like armature, engraves or embosses a record surface to produce a sound track in accordance with electrical signals applied to the recorder head.

Such a recorder head is well adapted for incorporation in a recording machine of the type described in U. S. Patent 2,371,116 to Yerkovich et al., which utilizes a flexible endless loop record blank of plastic material.

In accordance with the present invention, a recorder head is provided which has few parts, is simple in construction, and small in physical size, and which incorporates an improved damping structure which assists in centering the flexible reed-like armature and is readily adjustable under actual operating conditions.

It is often necessary or desirable to operate the recorder head in a position close to the microphone, as for example, when recording the conversations of several individuals in conference. The microphone translates the air vibrations into electrical signals and feeds them to amplifier circuits which are coupled, in turn, to the recorder head. If the recorder head radiates sound waves of appreciable magnitude, these waves impinge upon the microphone and produce a feed-back effect which prevents faithful recording of the sound signals. This action may be deleterious to the recording even though the feed-back is not of sufficient intensity to produce self-sustained oscillations, that is, a continuous whistle or howl. The present recorder head is designed so that acoustic waves produced by the moving parts are attenuated sufficiently that no troublesome feedback is caused by radiation of these waves from the head.

When mechanical resonance occurs in the moving system of a recorder head, the stylus does not correspond faithfully with the waveform of the sound signal which is to be recorded, especially when that signal contains frequencies near the particular resonant frequencies of the moving system. Thus, if the resonance is pronounced or occurs at a large number of frequencies, the cyclic storage and release of energy by the resonant components will prevent faithful recording of the sound signals. In the present recorder head undesirable complex mechanical resonance effects, within the frequency range of the system, are minimized by the simple construction of the moving system which comprises a reed-like armature of uniform thickness and simple outline contours.

Accordingly, it is an object of this invention to provide an improved electromagnetic recorder having a minimum number of parts and a moving system of extremely low inertia.

It is another object of this invention to provide such a magnetic recorder having an improved and simplified damping structure, wherein oppositely-disposed individually adjustable damping members engage opposite points on a reed-like armature.

It is a further object to provide a recorder head with low acoustic radiation and which may be operated close to the microphone without danger of objectionable feedback.

It is still another object to minimize mechanical resonances occurring within the audio frequency range by providing a recorder head having a moving system of simple contour and extremely low inertia. In this aspect of the invention, it is an object to provide such a recorder in which the moving system comprises a vibratory reed-like armature of uniform thickness, mounted between opposed plane faces of two oppositely poled permanent magnets, and a permanent stylus mounted on an integral extension of the armature, to provide a recorder head having low mass, and hence low stiffness, and, accordingly, high power sensitivity.

These and other objects will be apparent from a consideration of the following description taken in conjunction with the accompanying drawings in which.

Figures 1, 2, 3, 4:
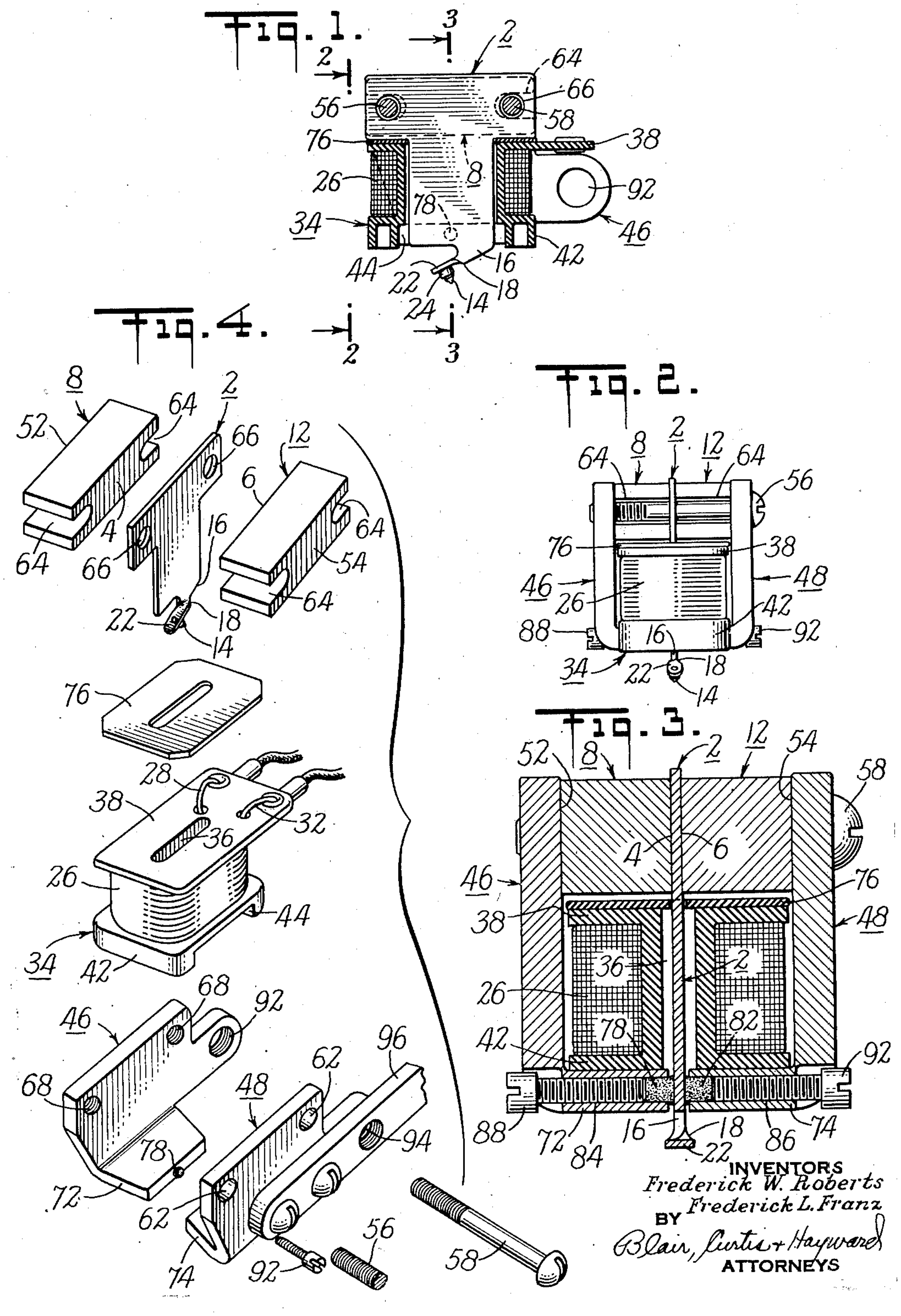
Figure 1 is a sectional view of the recording head.
Figure 2 is an end view taken in the direction of line 2—2 of Figure 1.
Figure 3 is an enlarged sectional view in the direction of Figure 2 and taken along line 3—3 of Figure 1.
Figure 4 is an exploded view showing, in perspective, the component parts of the recording unit.

The construction of the recorder head embodying the principles of this invention may be seen clearly by noting the component parts in Figure 4 and observing their mutal relationships in the assembled recorder as shown in Figures 1, 2 and 3.

The moving system of the recorder comprises an armature 2 in the form of a thin flexible metal reed, constructed of highly permeable magnetic material, for example, soft iron, secured between and extending downwardly from smooth faces 4 and 6 of two opposed oppositely-poled permanent magnets 8 and 12. The armature 2 is T-shaped, with the cross-bar of the T clamped between the two permanent magnets 8 and 12. The vertical portion of the T is of uniform width and the entire armature is of uniform thickness.

A permanent stylus 14 is supported at the lower end of the armature 2 by an inclined stylus supporting arm 16 (see Fig. 1), preferably formed integrally with the armature 2, which extends generally downwardly from the armature and is provided with a substantially right angle twist, as at 18, to form a base portion 22 having a small plane surface which is substantially perpendicular to the plane of the armature 2. A stylus holder 24, secured to the underside of this base 22, for example by soldering, supports the stylus 14 which extends generally downwardly at an angle substantially perpendicular to the plane of the base portion 22.

The upper end of the armature 2, thus, is secured firmly and because of the resiliency of the armature, the lower end, together with the stylus 14, is free to move or vibrate restrictedly when a suitable displacement force is applied to the armature 2.

In order to vibrate the armature 2 in accordance with sound signals, an energizing coil 26 (see Fig. 4), positioned around the vertical portion of the T, induces magnetic flux in accordance with the polarity and magnitude of the electrical signals which are applied to the coil through two leads 28 and 32.

The energizing coil 26 is wound on a coil form or spool 34, of plastic or other suitable material, which is provided with an elongated central opening 36, extending vertically through the coil form 34, of such dimensions as to permit the lower portion of the armature including the base portion 22 and stylus holder 24 to pass freely therethrough so that the unit may be assembled easily. The coil form 34 is molded, advantageously in one piece, and includes upper and lower end-plates 38 and 42 respectively; the lower plate 42 having a recessed portion 44 for positioning the coil form relative to two pole pieces 46 and 48, as described below.

Left-hand pole piece 46 and right-hand pole piece 48, which are L-shaped and constructed of soft iron in order to provide a low reluctance path for the magnetic flux, are secured, respectively, to the flat outer faces 52 and 54 of the permanent magnets 8 and 12. The pole pieces 46 and 48, the magnets 8 and 12, and the crossbar of the armature 2 are clamped together by two screws 56 and 58 which pass through clearance openings 62 in the right-hand pole piece, slots 64 in the permanent magnets, and clearance openings 66 in the crossbar of the armature, into threaded openings 68 in the left-hand pole piece 46.

These pole pieces 46 and 48, extend downwardly from the permanent magnets 8 and 12, respectively, with the horizontal portions of the pole pieces extending inwardly toward each other and forming, between pole tips 72 and 74 thereof, a small airgap through which the armature 2 extends. The horizontal portions of the pole pieces 46 and 48 are positioned in the recessed portion 44 of the lower end of the coil form 34 to maintain the relative positions of the coil form and pole pieces.

In order to provide insulation between the permanent magnets and the coil leads 28 and 32, a thin washer 76, constructed of plastic or other suitable insulating material, is interposed between the magnets and the upper end-plate 38 of the coil form 34.

In order to insure faithful recording of the sound signals, provision is made to apply suitable damping to the vibratable armature 2. As shown in Figure 3, the vibrations of its lower end are damped by two cylindrically-shaped pads 78 and 82, formed of suitable resilient damping material, for example, rubber, slidably disposed on either side of the armature 2 in holes 84 and 86 which extend laterally through the horizontal portions of the left and right hand pole pieces 46 and 48, respectively. Two screws 88 and 92, threaded into the holes 84 and 86, respectively, are provided to adjust the damping action. These screws are arranged so that, by individual adjustment thereof, the damping force which is applied to the same portion of the moving system as are the magnetic forces which tend to vibrate the armature 2 about its central position, may be adjusted for optimum performance after the recorder head is completely assembled, or, even in actual operation. These adjustments also assist in centering the armature 2 in the airgap.

In order to permit compliance of the recorder head in a vertical plane and at the same time prevent or restrict compliance in the horizontal direction, the recorder is mounted pivotally on suitable pivot screws (not shown) threaded into openings 92 and 94 in the pole pieces 46 and 48, respectively. An arm 96 may be provided for lifting the recorder head when moving the carriage or changing the record.

In operation, an electrical current, which varies in magnitude in accordance with the waveform of the sound signals which are to be recorded, is passed through the energizing coil 26 and produces a correspondingly varying flux in the magnetic circuit comprising the pole pieces 46 and 48, armature 2, and permanent magnets 8 and 12. Because of the arrangement of the permanent magnets 8 and 12, one of the pole tips 72 or 74 is a north magnetic pole and the other is a south magnetic pole. The magnetic forces produced by the pole tips 72 and 74 urge the lower end of the armature 2 in opposite directions, so that when no additional magnetic flux, as would be caused by signal current in coil 26, is imposed on the circuit, the armature 2 does not move toward either of the pole tips but, because of the stiffness of the armature, remains in its central position. When the coil 26 is energized, however, the reed vibrates between the pole tips 72 and 74 in accordance with the variations in the waveform of the signal current. Thus, the lower end of the reed 2 and the stylus 14 are moved laterally in accordance with the sound signals and the sound track is swaged or embossed, accordingly, on the record surface.

We claim:

1. A recorder for inscribing sound signals on a record surface, comprising, a permanent source a magnetic flux, spaced and oppositely disposed magnetizable pole tips connected to opposite poles of said permanent magnet source, a resilient reed-armature rigidly supported at one end and of uniform thickness throughout its unsupported portion and having a portion thereof disposed between said pole tips and free to vibrate relative thereto, a stylus supported by said reed-armature and arranged to move therewith to inscribe sound signals on a record surface in accordance with vibrations of said reed-armature, and an actuating coil surrounding a portion of said reed-armature for causing said reed-armature to vibrate in accordance with electrical signals applied to said coil.

2. A recorder for inscribing sound signals on a record surface, comprising, a permanent source of magnetic flux, spaced and oppositely disposed magnetizable pole tips, oppositely disposed pole pieces connecting said pole tips to opposite poles of said permanent magnet source, a resilient reed-armature of uniform thickness throughout its length having a portion thereof disposed between said pole tips and free to vibrate relative thereto, a stylus holding arm forming an integral part of said reed, a stylus supported by said arm and arranged to inscribe sound signals on a record surface in accordance with vibrations of said reed-armature, and an actuating coil surrounding a portion of said reed-armature for causing said reed-armature to vibrate in accordance with electrical signals applied to said coil.

3. A recorder for inscribing sound signals on a record surface, comprising, a permanent source of magnetic flux, spaced and oppositely disposed magnetizable pole tips, oppositely disposed pole pieces connecting said pole tips to opposite poles of said source, a resilient reed-armature of uniform thickness supported at one end and having a portion thereof disposed between said pole tips and being arranged to vibrate thoughout its unsupported length, a stylus supported by said reed-armature and arranged to move therewith to inscribe sound signals on a record surface in accordance with vibrations of said reed-armature, and an actuating coil surrounding a portion of said reed-armature for causing said reed-armature to flux in accordance with electrical signals applied to said coil, said pole pieces, pole tips and coil substantially enclosing in close spaced relation the unsupported portion of said reed-armature thereby attenuating air vibrations produced by the reed-armature and preventing acoustic radiation.

4. A recorder for inscribing sound signals on a record surface, comprising, a first and a second permanent magnet, spaced and oppositely disposed magnetizable pole tips, oppositely disposed pole pieces connecting said pole tips to opposite poles of said permanent magnets, a stylus-supporting reed-armature having a portion thereof disposed between said pole tips and free to vibrate relative thereto and another portion in clamped direct engagement with opposite poles of said first and second permanent magnets, a stylus supported by said reed-armature and arranged to move therewith to inscribe sound signals on a record surface in accordance with vibrations of said reed-armature, and an actuating coil surrounding a portion of said reed-armature for causing said reed-armature to vibrate in accordance with electrical signals applied to said coil.

5. A recorder for inscribing sound signals on a record surface, comprising, a permanent source of magnetic flux, spaced and oppositely disposed magnetizable pole tips connected to opposite poles of said magnetic source, a flexible reed-armature rigidly clamped at one end and having a portion thereof disposed between said pole tips and free to vibrate relative thereto, a stylus supported by said reed-armature and arranged to move therewith to inscribe sound signals on a record surface in accordance with vibrations of said reed-armature, an actuating coil surrounding a portion of said reed-armature for causing said reed-armature to vibrate in accordance with electrical signals applied to said coil, and first and second oppositely disposed damping pads supported, respectively, by said pole tips and arranged to make contact with opposite surfaces of the portion of said reed-armature positioned between said pole tips.

6. A recorder for inscribing sound signals on a record surface, comprising, a permanent source of magnetic flux, spaced and oppositely disposed magnetizable pole tips connected to opposite poles of said source, a resilient reed-armature of uniform thickness and rigidly clamped at one end, the opposite end-portion being disposed between said pole tips and free to vibrate relative thereto, a stylus supported by said reed-armature and arranged to move therewith to inscribe sound signals on a record surface in accordance with the flexing of said reed-armature, an actuating coil surrounding a portion of said reed-armature for causing said reed-armature to vibrate in accordance with electrical signals applied to said coil, a first and a second horizontal opening through said pole tips and the horizontally extending portions of said pole pieces, a first and a second resilient cylindrically-shaped damping pad extending, respectively, from said openings and making contact with opposite sides of said reed-armature between said pole tips, a first and a second externally-accessible, individually-adjustable screw in threaded engagement, respectively, with said first and second openings and applying pressure to said pads to regulate the damping effect thereof.

7. A recorder for inscribing sound signals on a record surface, comprising, two permanent magnets each having plane parallel inner and outer faces, said outer faces being of opposite magnetic polarity, a thin resilient T-shaped reed-armature of uniform thickness and constructed of easily magnetizable material, two transverse screw members holding the inner faces of said magnets in engagement with the upper end-portion of said reed-armature, two pole pieces secured, respectively, to the outer faces of said magnets and extending downwardly therefrom, two inwardly extending pole tips formed integrally with said pole pieces and in oppositely-disposed, spaced relationship relative to the lower end of said armature, an actuating coil surrounding the center portion of said reed-armature for causing lateral vibration thereof, a plastic coil form for supporting said coil and having a cutout portion for positioning said pole tips relative to said coil, said coil, pole pieces and pole tips forming a substantially complete enclosure for the vibrating portion of said reed and preventing acoustic radiation therefrom, a first threaded opening laterally through one of said pole tips, an aligned threaded opening laterally through the other of said pole tips, a first and a second cylindrically shaped resilient damping pad, each of said pads being disposed in one of said openings, two oppositely-disposed, individually-adjustable, externally accessible adjusting screws in threaded engagement with said first and second openings, respectively, and maintaining said damping pads in contact with opposite sides of said reed-armature to prevent excessive vibration thereof, a stylus holding arm formed integrally with said reed-armature and extending generally downwardly therefrom and having a right angled twist therein to provide increased lateral rigidity and form a stylus supporting base, and a permanent stylus secured to said base and extending generally downwardly therefrom for inscribing sound signals in accordance with vibrations of said reed-armature.

8. A recorder for inscribing sound signals on a record surface, comprising two similar permanent magnets, a reed armature, means supporting said magnets with their magnetic poles arranged in series relationship with a portion of said armature therebetween, separate pole pieces each positioned in magnetic contact with opposite poles of said magnets, said pole pieces extending in substantially parallel direction away from said magnets and approaching from opposite directions a common portion of said armature at a point spaced from said magnets, an actuating coil surrounding said armature between said common portion of said armature and said magnets, and a recording stylus positioned adjacent and mechanically secured to said armature.

FREDERICK W. ROBERTS.
FREDERICK L. FRANZ.

REFERENCES CITED

The following references are of record in the file of this patent:

UNITED STATES PATENTS

| Number | Name | Date |
|---|---|---|
| 1,728,278 | Miessner | Sept. 17, 1929 |
| 1,804,961 | Thomas | May 12, 1931 |
| 1,817,021 | Schimpf | Aug. 4, 1931 |
| 1,823,162 | Pearson et al. | Sept. 15, 1931 |
| 1,833,070 | Crouse | Nov. 24, 1931 |
| 1,974,895 | Round | Sept. 25, 1934 |
| 2,107,050 | Bender | Feb. 1, 1938 |
| 2,163,161 | Wadsworth | June 20, 1939 |
| 2,300,638 | Wente | Nov. 3, 1942 |
| 2,376,131 | Dunlap et al. | May 15, 1945 |
| 2,379,282 | Dally et al. | June 26, 1945 |
| 2,381,673 | Lehde | Aug. 7, 1945 |
| 2,391,627 | Howell | Dec. 25, 1945 |
| 2,400,305 | Hazeltine | May 14, 1946 |
| 2,422,817 | Baker | June 24, 1947 |
| 2,426,061 | Snepvangers | Aug. 19, 1947 |
| 2,432,444 | Roberts | Dec. 9, 1947 |
| 2,454,425 | Bauer | Nov. 23, 1948 |

FOREIGN PATENTS

| Number | Country | Date |
|---|---|---|
| 315,596 | Great Britain | July 18, 1929 |
| 629,363 | France | Nov. 9, 1927 |
| 764,896 | France | May 29, 1934 |